July 29, 1941. A. WRIGHT 2,250,615
RUG MACHINE
Filed Oct. 19, 1938 5 Sheets-Sheet 1

INVENTOR:
ACHSA WRIGHT,
BY: Horace S. Woodward
ATTORNEY.

July 29, 1941.　　　A. WRIGHT　　　2,250,615
RUG MACHINE
Filed Oct. 19, 1938　　　5 Sheets-Sheet 3

INVENTOR:
ACHSA WRIGHT,
BY:
Horace J Woodward
ATTORNEYS.

July 29, 1941.  A. WRIGHT  2,250,615
RUG MACHINE
Filed Oct. 19, 1938   5 Sheets-Sheet 5

INVENTOR:
Achsa Wright,
BY Horace L. Woodward
ATTORNEYS.

Patented July 29, 1941

2,250,615

UNITED STATES PATENT OFFICE 2,250,615

RUG MACHINE

Achsa Wright, San Francisco, Calif.

Application October 19, 1938, Serial No. 235,844

10 Claims. (Cl. 112—2)

The invention relates to rug machines and the like, of the general character indicated in my Patent No. 1,366,624, of January 25, 1921, and has for an object to effect improvements to the end of enabling more rapid work by a single operator, at the same time that a simple machine is provided suitable for hand operation in the home.

One of the important objects of the invention is to enable placing of woven or other fabric segments or blanks on needles by automatic operation of the machine, requiring only the swinging of a lever, by the operator or motor actuation. It is also an aim to present a novel means for accomplishing the feeding, placing and cutting of the fabric pieces.

Another object is to give novel means to mount and shift the needles upon which the fabric pieces or blanks are threaded, to the end that the accumulated material on a series of needles may be easily and quickly shifted therefrom onto the thread from the needle, so as to make up warp elements to be built into the rug.

Another object is to enable the weaving of the built-up warp material into a rug in the same machine where the warp is made up and as a part of the operation of a unitary machine, so as to produce a completed rug, or rug strip of any desired length.

It is an important object to embody a machine which will enable progressive weaving of the rug as the warp stock is made.

Another important attainment of the invention is the presentation of a novel weaving device specially coordinated with the warp and warp-producing elements.

Additional objects include the provision of novel needle holding devices; fabric cutting means, stock reel device, fabric strip feeding devices, and operating means therefor.

Further objects, advantages and features of invention reside in the construction, arrangement and combinations of parts involved in the embodiment of the invention, as will appear from the following description and accompanying drawings, wherein

Figure 3 is an elevation of the strip feed and cutter station approximately one-half size, showing dotted the lowered position of the needle holder and the transfer holder or unloader in open position.

Figure 3—a is a detail of the needle transfer holder or unloader shown at A, in Figure 3.

Figure 5—a is a fragment of a similar section enlarged, showing the preferred use with paired warps 54.

There is illustrated a machine comprising a bed frame 20, consisting of side members or stringers 21, and cross members 22. On the bed frame, at the left end as viewed in Figures 1 and 2, there is mounted a fabric strip feed, cutting, and threading unit 23, while midway of the frame there is a weaving unit 24, and at the right hand end of the frame there is a reel 25 for completed rug stock as shown.

Figures 1, 2, 21, 22:
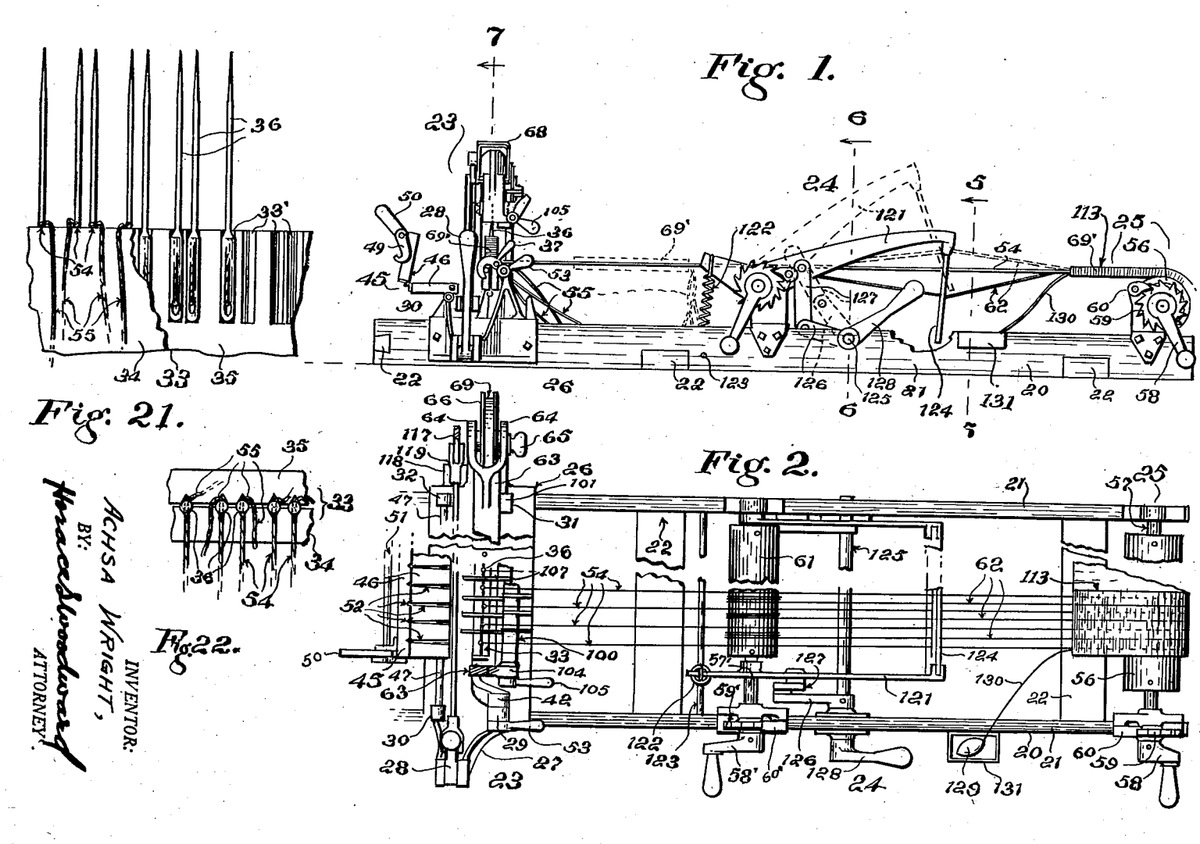
Figure 1 is a front side elevation of a machine embodying my invention, in one form.
Figure 2 is a top view thereof, with part of the fabric strip feeder broken away.
Figure 21 is a fragmentary elevation, full size, of the twin needle holder, with parts broken away exposing the needle bases.
Figure 22 is a fragmentary top view of the structure of Figure 21.

The unit 23 includes a number of instrumentalities, including means adapted to hold needles releasably in erect position to receive squares or blanks of woven fabric stock thereon as shown in Fig. 1. To make up the warp material for a rug; means to place or load the woven stock on the needles, means to cut it into the desired squares, and means to receive the needles when moved from loading position and hold them in unloading position when released from the first holding means.

The unit 23 comprises a frame 26, which may be formed in one or more parts as found most practical, at present being shown in one piece, which may be cast in suitable metal, such as aluminum. It includes a front low bracket part 27, in which an operating lever 28 is mounted for the stock feed device, a front bearing bracket 29 for a main needle holder 33, and a front bearing bracket 30 for the second needle holder or unloader 45. At the opposite or rear side of the machine a bearing bracket 31 is alined with the one 29, supporting the rear end of the holder 33, and a bearing bracket 32 alined with the one 30 for the unloader 45. On the brackets 29 and 31 the main needle holder 33 is mounted, this comprising right and left clamp blocks 34 and 35 hingedly connected at their lower edges so that they may lie in close clamping relation upon a multiplicity of needles 36 laid between the two, and which project vertically from between the blocks when the holder is in normal operative or loading position, as in Figures 1 and 3. One block is provided with cam-latches 37—38 at its front and rear ends, fixed on a shaft 39 revoluble in the block, the other block having longitudinally projecting end pins 40 to be received in the latch as on rotation of the shaft in one direction, and to clear the latches at an alternate extreme position of the shaft. The front latch is provided with a latch operating lever 41 by which both may be operated simultaneously, due to rotation of the shaft 39. The blocks 34 and 35 are preferably provided with shallow grooves 33' adapted to receive the bases of the needles, shown as enlarged and cylindrical and having eyes in these parts. The needles will be clamped before the opposed faces of the blocks engage each other, thus assuring a firm support of the needles.

The cam latches of the needle holder are in the form of curved hook arms slightly eccentric to the shaft 39 so that as they are moved into binding engagement with the pins by rotation of the shaft 39 the blocks will be drawn tightly upon the needles. The block 34 carrying the latches is erect at the right when in operative position at A, as viewed in Figures 3 and 1. The left hand block 35 has mounted thereon bracket arms 42 having trunnions engaged in the respective bearings 29 and 31, on an axis located rearwardly of the normally right hand block 34 and intermediately of the height of the main holder. A detent 43 is pivoted on the base plate 26, beneath the left hand edge of the main needle holder when in normal operative and loading position, as shown in Figure 3, at A.

The detent is spring-pressed to swing to the right into supporting relation to the needle holder, so as to support the latter in loading position, the detent having a heel portion 43' to engage the plate 26 and check it in supporting position, and being yieldable to pressure of the holder thereagainst when the latter is moved to loading position. The detent is manually movable to the left to permit the needle holder to drop by gravity to the dotted position shown at B in Figure 3. A second detent 44 similar to the first but operative in a reverse direction is mounted so as to support the needle holder in lowered position as at B. The needle holder may be opened while in the last named position by raising the block 34 to the position dotted at C in Figure 3, after releasing the latches 37—38. The detents 43—44 may be moved manually or otherwise to releasing position to permit the necessary movements of the needle holder as will be described. A second needle holder, which may be termed the unloader 45 is constructed of upper and lower blocks 46 similar to those of the main needle holder, hingedly connected at the left, and mounted adjacent their hinged edges on a shaft 47 mounted in the bearing brackets 30 and 32. These blocks may be secured in clamping relation by means similar to that used on the main holder, or if more positive clamping and powerful clamping means is required both holders may be equipped with the latching means shown on the unloader. This consists of pins 48 set in the ends of the lower block, and a hook link 49 pivoted freely intermediately on a lever 50 of the second order at each end of the block, fastened to respective ends of a shaft 51 revoluble on the block. The hook links swing free and are of such length and connection that their pivots on the lever pass dead center while the blocks are drawn tightly together by the links. They thus are yieldingly held in fastening relation to the clamp or holder 45 by the reaction of the blocks against compression. The needles 36 are simple shafts of steel with sharp points at their upper ends, and having eyes at their lower ends to receive warp threads 54 therethrough, as will be described.

The clamp blocks of the main holder and of the unloader may be suitably grooved to enable secure clamping of the needles and assure uniform spacing thereof, as indicated at 52 in Figure 2, on the unloader.

Figures 3, 3A:
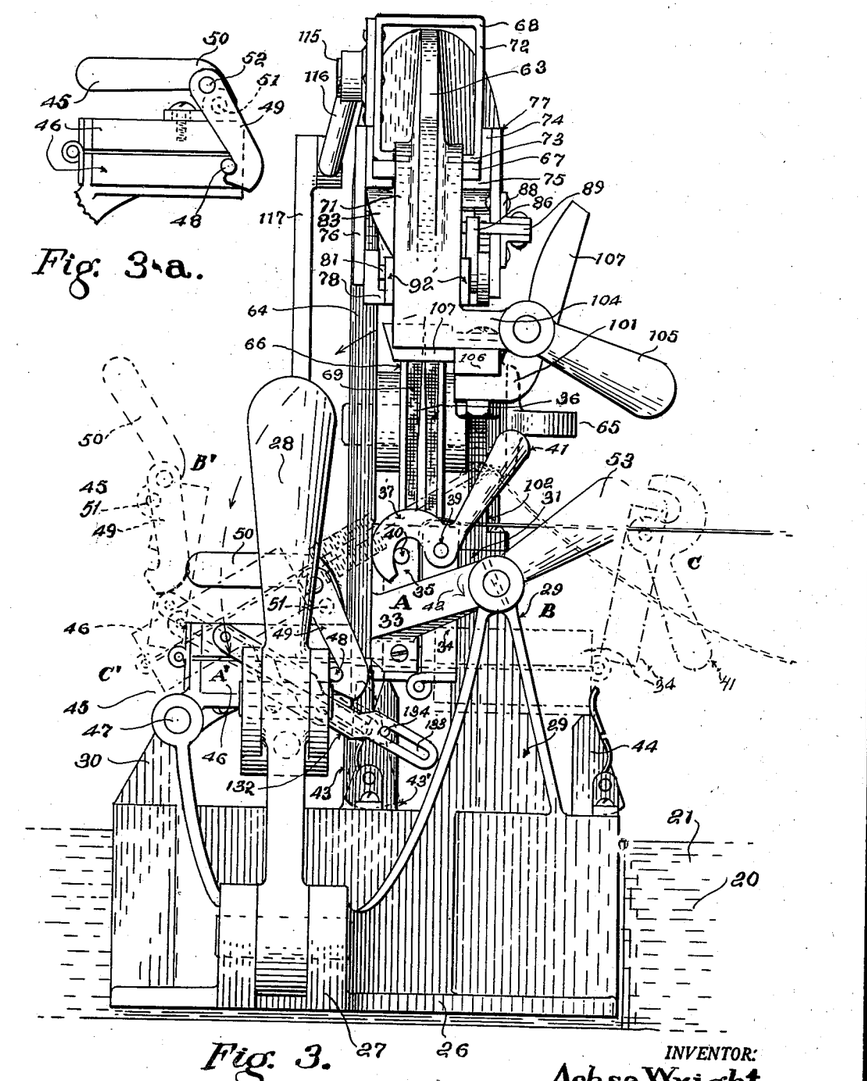
Figure 4:
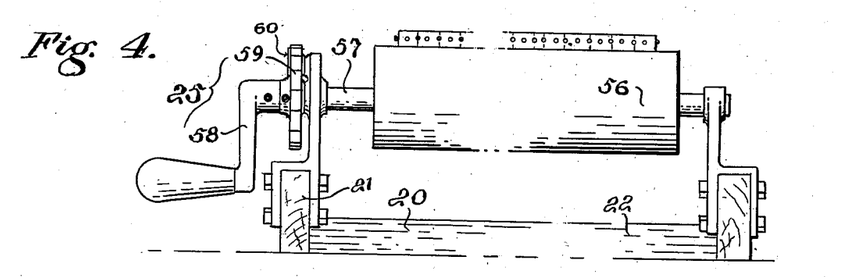
Figure 4 is a right hand elevation of the rug reel unit of Figure 1, with the rug in section.

An operating handle 53 is secured to the arm 42 or its trunnion at the front side of the machine, by which the holder 33 may be swung from lowered position as dotted at B, in Figure 3, to the operative loading position at A, it being necessary to manually release the detent 44 to permit this movement, and it will automatically become supported properly by the detent 43, which first yields to the holder and then swings into place thereunder by action of its spring.

The needles have respective main warp threads 54 engaged through their eyes, loose ends 55 of suitable length being extended downwardly and allowed to lie within the frame 20, while the other ends are extended horizontally through the entire length of the machine and attached to an elevated reel drum 56 mounted on suitable brackets 25 on the stringers 21. It will be noted that the nearest adjacent cross piece 22 is located some distance from the end of the bed frame 20 inwardly of the reel, and that the stringers have no other connection between them than the drum shaft 57 at their extremities, minimizing likelihood of obstruction or interference with the manipulation of the material on the drum, as will appear. The drum is fixed on the shaft 57, to which a crank 58 is attached for operating the drum as required, and a ratchet wheel 59 is also secured on the shaft engaged by a pawl 60 by which the warp threads 54 are held under moderate tension as required.

Intermediately of the length of the bed frame a second elevated reel drum 61 similar to the one 56 is similarly mounted, and provided with crank 58', ratchet 59', and pawl 60', except that these are operative in an opposite direction to those first mentioned. Secondary warp threads 62 are carried by the drum 61 extended to the drum 56, alternated between the pairs of warps 54. The thread 62 may extend from spools, spindles or other source to the reel 61, or any other approved means for supporting and holding the thread 62 may be employed in place of this reel device.

Figure 5:
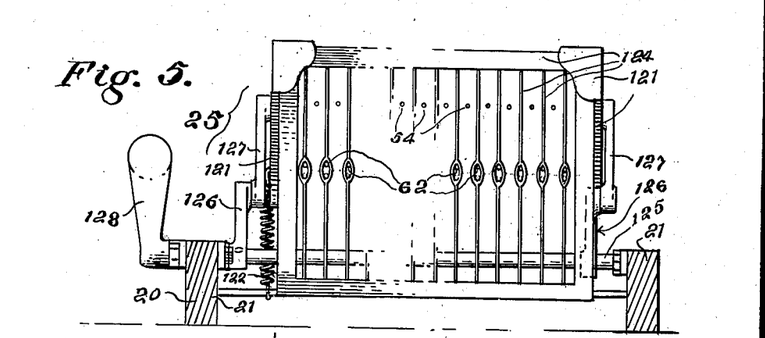
Figure 5 is a cross section on the line 5—5 of Figure 1.
Figure 6:
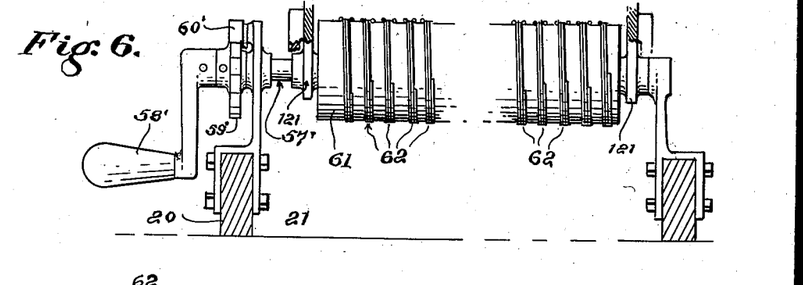
Figure 6 is a cross section on the line 6—6 of Figure 1.
Figure 14:
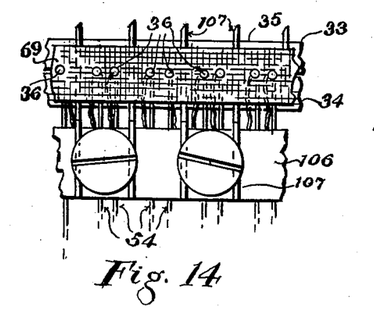
Figure 14 is a fragmentary plan of a twin needle holder, rug stock, and lower cutter, to thread two warps through each cut piece of fabric, whereby the threaded pieces will not turn out of alinement in the string of pieces on each warp pair.
Figure 15:
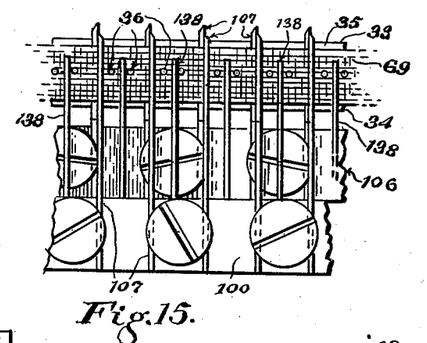
Figure 15 shows the use of presser wires 133 on the upper knife block.
Figure 16:
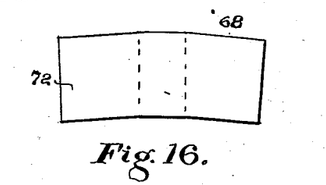
Figure 16 is a plan of the blank for the carriage body.
Figures 17, 18, 19:
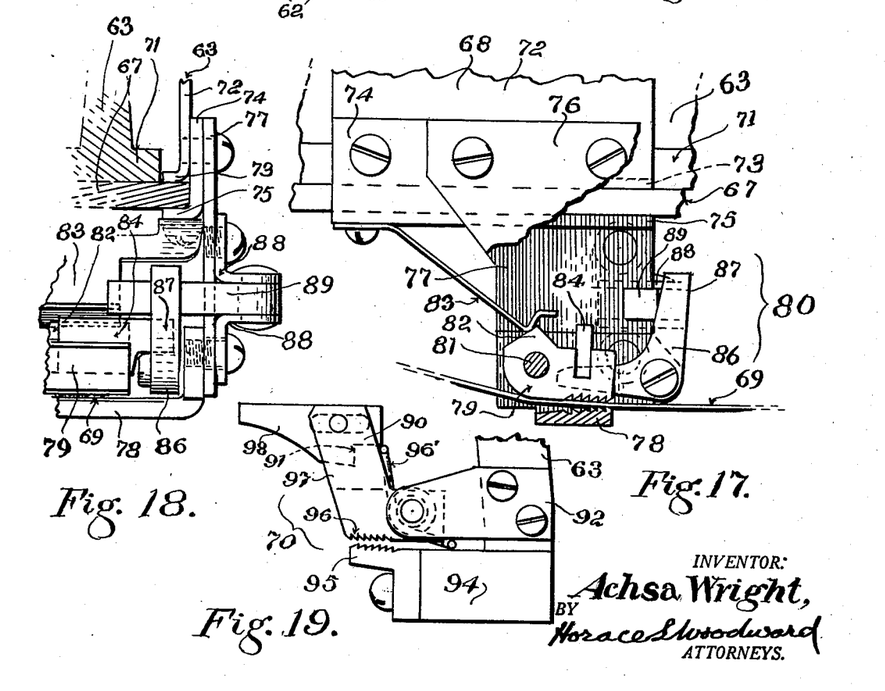
Figure 17 is a detail of the travelling gripper from the left.
Figure 18 is a front view of the travelling gripper.
Figure 19 is a left elevation of the stationary gripper.
Figure 20:
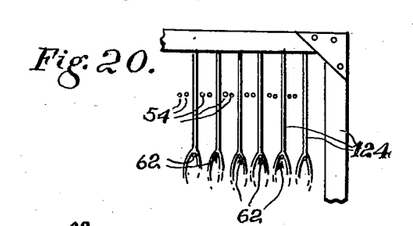
Figure 20 is a fragmentary detail of the heddle with twin warps.

It is considered preferable to mount the needles 36 in pairs, the needles in each pair being spaced apart about one-eighth of an inch or more, where a rug is to be made of half inch blanks of cloth, and the spacing between the blanks of mutually adjacent pairs would be about one quarter of an inch, substantially as indicated in Figures 5—a, 14, and 15. By having two warp threads through the fabric blanks, they are prevented from turning in the rug of the warp before weaving, so that a good flat surface is easily formed on the rug. In the use of the paired needles and consequently paired warps 54, the supplementary warp threads 62 are still used, alternated with pairs of warps 54. The spacing of the needles may be varied in proportion to the size of the fabric to be used, and this spacing may be determined by the location of the grooves 62 of the clamp blocks. The needles are initially placed manually in the main needle holder, or may be located by having the unloading holder loosely clamped and inserting the point ends of the needles frictionally in respective opposed grooves of the unloader, adjusting the needles so their butts project uniformly a proper distance from the unloader. Then, while the main holder is in lowered position and open, and the needles all threaded, the threads being attached to the drum 56, the loose ends 55 are pulled until the warp 54 portions are of a uniform length, after which the unloader is swung so as to lay the butts in the grooves of the lower block of the loader, after which the upper block of the loader is swung to closed position clamping the needles, and the latch 37 forced to clamping position. The unloader is then opened, and the loader 33 swung to loading position, leaving the unloader ready for an unloading operation to be described.

For forming and emplacement of fabric blanks a cross arm 63 is mounted transversely over the machine, formed integrally with the parts of the frame, including two upstanding arms 64 formed integrally and carrying a reel mounting pin 65 therebetween on which a reel 66 is mounted for carrying a ribbon of stock fabric, from which the rug blanks are formed. The reel is removable having the pin 67 inserted therethrough and through the arms 64 and if desired, may include any well known friction means to prevent too easy rotation of the reel.

The cross arm is provided with a rail plate 67 extended horizontally throughout its major part and especially over the needles and rearwardly thereof, on which a carriage 68 is reciprocable by which a fabric strip 69 is fed from the reel 66 to a gripper 70 at the front extremity of the cross arm, and held taut closely over the points of the needles.

The cross arm 63 is in the form of an inverted letter T in cross section, its vertical flange tapering from its rear part to the front while the base flange 71 is of uniform width and thickness throughout, and the rail plate 67 is held thereto with screws as shown. The plate 67 is wider than the flange 71 so as to present projecting edge portions at each side which serve as rails for the carriage, as will appear.

The carriage consists of an upper body portion 72 formed of sheet steel hardened after forming, substantially U-shaped in cross section, its bight portion being of substantially the same width as the rail plate 67 and the extremities of its sides being bent inwardly at a sharp right angle and trimmed to form flanges 73 adapted to rest slidably on the upper side of the rail edges of the plate 67 flush against the edges of the flange 71. Keeper plates 74 are attached to the lower parts of the carriage sides, having inturned flanges 75 coextensive with the flanges 73 and arranged to slidably engage the lower surface of the rail plate while the flanges 73 rest on the upper side thereof. In addition, and held by the same fastenings, cheek plates 76 and 77 are secured to the left and right sides of the carriage body outwardly of the plates 74, extending below the plates 74 and serving as a mounting for a travelling gripper 80 on the carriage.

This gripper 80 consists of a bottom or anvil bar 78, extending transversely between and slightly below the lower edges of the cheek plates, and having upturned ends flush against and secured to the inner sides of the cheek plates, over which bar the fabric strip 69 is extended through the carriage to the stationary or front gripper 70. Directly over the fabric strip a clamp block 79 is mounted, having a shaft 81 fixed therein revoluble in the upturned ends of the anvil bar between the cheek plates. The block 79 extends forwardly of its shaft so that it may rise and fall upon the anvil bar to release or clamp the strip 69. The block is formed with a cam 82 on its upper side having faces sloping oppositely from a central high edge over the shaft 81, and a spring 83 is secured to the under sides of the flanges 75 at their rear parts, extended forwardly and downwardly, with a V-shaped wiper part bearing downwardly on the cam so that pressure of the angle of the V against the cam will hold it alternately in open or closed positions, yieldingly, the angle of the wiper passing the high edge of the cam while the clamp block is in released position. The front edge of the clamp block may have points or other means to cause it to grip with high efficiency for pulling the strip 69 from the reel 66. The pressure of the spring 83 is specially efficient also in its coaction with the cam to prevent the strip 69 from being too easily pulled through the travelling gripper toward the front of the machine. The clamp block has a lateral arm or lug 84 at the right hand side, and secured to the arm 63 rearwardly of the rear limit of movement of the carriage, there is a striker arm 85, extended downwardly and forwardly and offset to the right at its extremity so as to lie to the right of and above the clamp block in the path of the arm 84 and bear upon the arm 84 when approaching its rear limit of travel so as to press the latter arm downward when the carriage is moved to rearmost position. The end of the striker is inclined so as to wipingly engage the arm 84 on the clamp block as the latter moves thereunder and so press it down until it compresses the strip 69 against the anvil bar, at the same time causing the high edge of the cam 82 to pass in front of the wiper of the spring, so that the latter will hold the clamp block against return or release movement sufficiently, and by bearing on the rear inclined face of the cams cause the clamp block to move into secure clamping engagement with the fabric strip 69. Pivoted on the inner side of a forward extension of the right hand cheek plate 77 there is a bell crank lever 86 having a rearwardly extending arm located close under the arm 84 of the clamp block when the latter is lowered, and having an upwardly extending arm 87 located slightly forward of the cheek plates at the same time. On the outer side of the cheek plate 77 bracket ears 88 are mounted between which a lever 89 is horizontally pivoted extending inwardly through a suitable slot in the plate 77, and rearwardly of the arm 87, being limited in its rearward movement by the edge of the slot in the plate 77 but free to move forwardly against the arm 87 of the bell crank whenever the lever 89 is pulled forward. This lever 89 extends to the left of the arm 87 a distance so that it may pass under a liftable dog 90 or clamp element of the front gripper 70 to be described, which dog has a downward extending bill portion 91 to engage behind the lever 89 and pull the same forward under rearward motion of the carriage, and so press on the arm 87 causing the bell crank lever 86 to lift the arm 84 of the travelling gripper and open the same in its initial return movement. As the gripper is opened the wiper edge of the spring 83 passes the high edge of the cam and holds the gripper open.

The stationary gripper consists of two side plates 92, secured to right and left sides of the extremity of the cross arm 63 and extending rearwardly. A rearward extension 94 of the front extremity of the arm 63 between the side plates 92 is finished with a vertical transverse face to which a stationary jaw 95 is secured having an upper grip face, while between the plates 92 a movable jaw 96 is pivoted rearwardly of the jaw 95 and adapted to close down thereon, being pressed by a spring 96' and always tending to close. Its gripping force by action of the spring may be slightly greater than that of the block 79. The jaw 96 has an upward extension 97 at its left side, on the right hand side of which a cam dog 98 is rigidly but adjustably secured. The cam dog is in line with the extreme end portion of the cross lever 89. The under side or cam face of the cam dog is inclined downwardly from its extremity, so that as the lever 89 strikes the cam dog the latter and the jaw 96 are lifted. The cam dog has a notch at its forward part forming a bill or shoulder 91 as a termination of the cam face, so that after the travelling gripper has moved into operative relation to the stationary gripper the lever 89 passes forwardly of the bill 91, which then drops behind the lever and upon a very slight reverse movement of the travelling gripper, the upper arm 87 is pulled forward, raising the clamp block 79. This releases the fabric strip before any material pull has been exerted thereon, and the spring 83 holds it in such released position until the carriage has completed its return or rearward movement and the striker 85 has pushed the arm 84 downward, when the spring 83 functions again to hold the clamp block in closed position.

The cross arm 63 has a lateral bearing extension 104 toward the right at its extremity, in which there is journalled the forward end of a shaft or trunnion 103 of a rocking blade block 100, the rear end of which block is supported by a journal in a bearing block 101 mounted on the upper end of a bracket 102 secured on top of the pedestal bracket 31 in which the rear trunnion of the main needle gripper 33 is mounted. The trunnion 103 extends through and beyond the bearing 104 and has secured thereon an operating handle 105 in front of the cross arm 63. The bracket 102 has mounted on its upper end the rear end of a stationary blade block 106, the forward end of which is held by screws to the underside of the end of the arm 63. A series of mutually coacting blades 107 are secured in the blocks 100 and 106, the blades in the block 106 being below the fabric strip 69, while those in the rocking block are above and arranged to shear the strip at each of the lower blades when the handle 105 is swung counter-clockwise.

Figures 7, 8, 9, 10, 11, 12, 13:
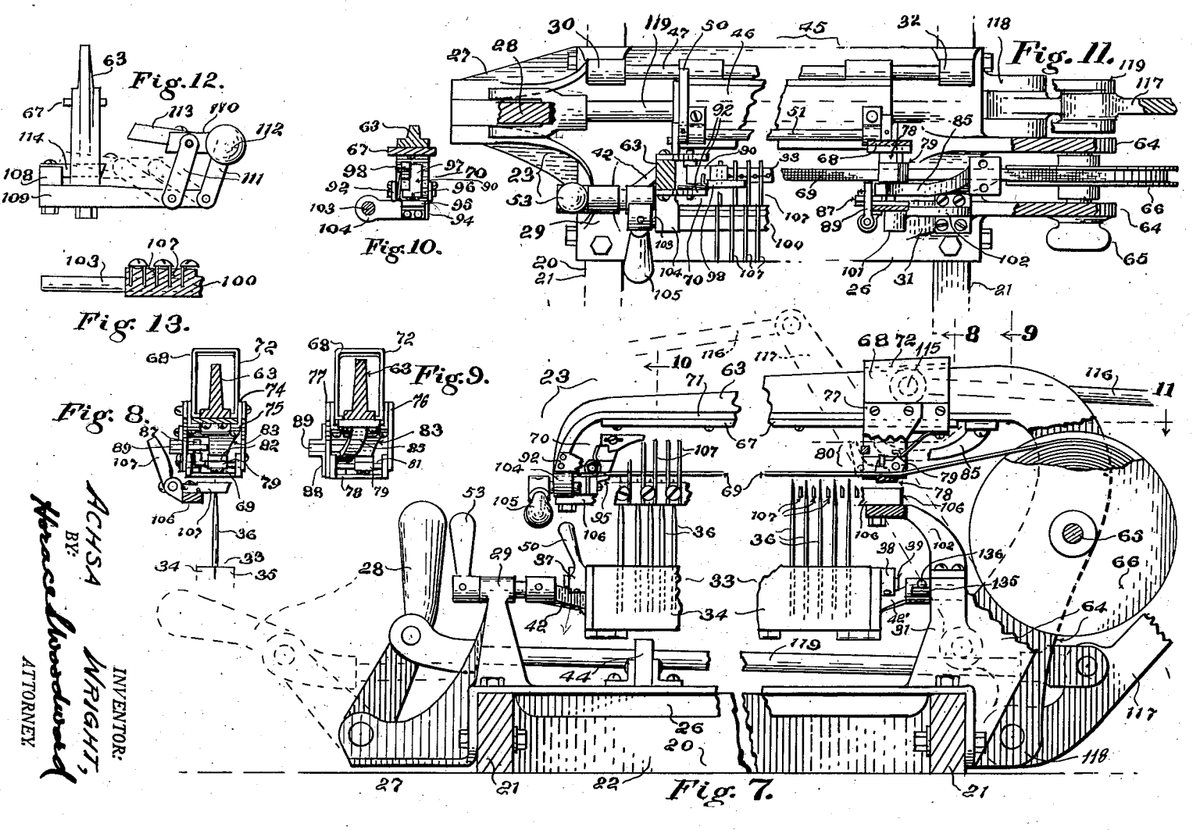
Figure 7 is an enlarged cross section on the line 7—7 of Figure 1, with the middle portion broken away to enable the illustration of the essential mechanism, single needles being shown where pairs may be used, to enable better illustration of the principle of the invention. The forward end of the striker 85 is shown broken away, and the outline of the removed part dotted in operative relation to the clamp block arm 84.
Figure 8 is a detail section on the line 8—8 of Figure 7.
Figure 9 is a similar view on the line 9 of Figure 7.
Figure 10 is a similar view on the line 10 of Figure 7.
Figure 11 is a horizontal section on the line 11 of Figure 7, with parts broken away.
Figure 12 is an elevation of a modified cutter.
Figure 13 is a detail of the moving blade assembly of Figs. 1, 3, 11.

A modification of the strip shearing means is indicated in Figure 12, where the stationary block 108 is mounted to the left of the cross arm 63 on a bar 109 secured to the bottom side of the end of the arm 63, which may be extended downward further than first shown, and a similar block may be supported at the rear on a like extension of the bracket 102. The bar 109 is extended to the right a distance as may be the bracket 102 and a cutter or swinging knife block 110 mounted thereabove by means of parallel links 111 pivoted on the block and on the bar and bracket extension, being operable by a handle 112 on the front end of the block 110. Blades 113, may be mounted as desired in the block 110 to coact with blades 114 on the block 108, as indicated in dotted lines in Figure 12.

The carriage body is provided with a wrist block pin 115, on the left side on which there is pivoted a link 116 connected to the upper end of an operating arm 117 fulcrumed between the ears 118 on the rear side of the frame 26 near the lower part of the frame 20. A main link 119 is connected to the arm 117 just above the fulcrum of the latter and to swing above the top of the frame 26, and the forward end of this main link is connected to the operating lever 28 earlier mentioned. When the lever 28 is operated from normal initial position shown in solid lines in Figure 7, to the dotted position there indicated, or a corresponding position, depending on the width of the machine, the carriage will be drawn forward, the travelling gripper drawing the strip 69 forwardly and the end of the strip projecting at the edge where last severed by the knives will be thrust between the jaws of the stationary gripper as the upper one is lifted by the lever 89 passing under the cam dog 90. The lifted jaw drops and grips the end of the strip as the lever 89 passes the bill 91. Reverse movement of the lever 28 then returns the carriage, and the bill 91 hooks the lever 89 and holds the same so that the lever 86 is rocked, lifting the lateral arm 84 of the clamp block 79, raising the latter, and causing the travelling gripper to be held open by the spring 83 while the gripper returns to initial position. The lever 89 swinging allows it to clear the bill 91. Carriage arrival at initial position results in the striker 85 forcing the clamp block 79 to closed position against the strip 69 again, aided finally by the spring 83, so that the strip will be held taut on the next operation of the knives.

Operation of the upper knives forces the fabric down around the needles, and if desired, the moving knife block may have resilient wire pressers 138 thereon to force the fabric further downward, yielding when the stock is piled a distance around the needles.

Pivoted on the shaft 57' of the warp drum 61, there is a U-shaped heddle carrying frame 121, one side of which is extended a distance to the left and connected by a balance spring 122 to a cross rod 123 on the frame below. The heddle 124 carried by the rocking frame 121 is of familiar construction and serves to raise and lower the secondary warp strands 62 above or below the strands 54, so as to perform the desired shedding. The frame 121 is rocked by means of a rock shaft 125 mounted in suitable bearings on the bed frame to the right of the drum 61, and provided with crank arms 126 connected by links 127 to intermediate parts of the side members of the heddle carrying frame 121. The shaft is adapted to be manually rocked by a suitable lever 128 fixed on its forward end and in front of the frame. A hand shuttle 129 is shown adapted to carry a weft thread 130, which may be passed through the sheds in accordance with familiar weaving practice, a box 131 being provided on the bed frame to receive the shuttle between times.

In operation, the needles are threaded individually by hand, arranged in the holder as before explained, and one end of the thread attached to the drum 56. Strands 62 are wound on the drum 61 and extended to drum 56, and these threads may extend to the drum 61 from spool racks of any usual form if desired. The ends of the strands 62 attached to the drum 56 are alternated between the pairs of strands 54. The tension of the warp strands 62 is adjusted at the drum 61.

A reel 66 of fabric strip 69 being mounted as shown, the outer end of the strip is drawn off and threaded between the anvil bar 78 and the clamp 79 of the travelling gripper with a short portion projecting from the front of the gripper. The lever 28 is then drawn forward to its limit, which may be regulated in any desired manner, and returned to initial position. This engages the end of the strip with the stationary gripper and holds the strip taut over the needles. The knives are next operated by moving the handle 105 to the left until the knives sever the strip 69 between each pair of needles 36, forming small rectangular blanks of the fabric on the needles. The cutting operation also forces the squares of fabric thus formed downward on the needles. The handle 105 being returned to initial position, the operation of the lever 28 is repeated, followed by a repeated operation of the knives, and this alternate reciprocation of the lever 28 and handle 105 continued until a suitable number of fabric squares have been accumulated on the needles 36. The lever 28 and handle 105 are then left at initial positions, and the unloader 45 opened as dotted in Figure 3 at B. The detent 43 is thereby moved by the link 132 from supporting relation to the needle holder 33, and the latter will drop by gravity to engagement with the detent 44, which will support it in position B dotted in Figure 3, or may be moved to this position by the lever 53. This brings the pointed ends of the needles into the grooves of the lower transfer or unloader clamp block 46.

The upper block of the unloader is now lowered again, the clamp hooks or links 49 engaged with the pins 48 and the lever 50 operated to secure the unloader in firm tight clamping engagement with the pointed needle ends. The main holder is now opened as at C in Figure 3, after which the unloader is moved to the inclined position indicated at C' in Figure 3, which elevates the needle butts and their threads. The main needle holder may now be closed for the time being, while the fabric blanks accumulated on the needles are pushed toward the right on to the warp strands 54. By counting the number of operations of the lever 28 and knives, the cut stock may be accumulated in uniform quantities or loads, and each load may be moved on to the weaving station, or a number of loads may be accumulated on the strands 54 between the loading station and the reel 61 to be subsequently woven into the rug, care being taken to keep the loads separated so that they may be moved separately through the weaving station. A comb, lay, or other device may be used for moving the loads of cut stock along the warp strands. After the cut stock has been unloaded from the needles as described, the main holder is again opened at C, and the unloader is lowered so as to bring the needle butts again into the grooves of the lower block 35, after which the block 34 is moved to closed position and secured by swinging of the latch lever 41 to clamping position. The unloader is now opened and the holder 33 then swung to initial or loading position again and the operation of lever 28 and knife handle 105 may be resumed to accumulate further stock on the needles.

The weft thread may be started and woven through the warp in the familiar way to such extent as desirable before the fabric blanks are started in the rug body, which is built up next to the reel 56, as at 113, in Figures 1 and 2, and wound on the reel as completed. The loads from the needles may be moved directly from the needles to the weaving unit and woven into the rug as each load is completed, or a number of loads accumulated and kept separate between the weaving station and the loading station, then woven in in immediate action. In either event, the individual loads are pushed past the heddle mutually by means of a comb lay or otherwise, and into the shed which happens to then be formed, care being taken to insure that the warp threads 62 are adjusted between mutually adjacent strings of fabric blanks on the warps 54 and the blanks pressed tightly against the previously woven weft threads. The shuttle is then moved through the shed, and the heddle operated to shed the warp as required, two or more wefts being woven between each two loads of blanks, preferably, and the woven stock thoroughly beat up as the weaving progresses.

As the woven fabric accumulates, the reel 56 is operated from time to time while the needles 36 are in the unloader at position C of Figure 3. Then, care is taken to move the upper block 34 of the main needle holder slowly to closed position adjusting the strands through the eyes of the needles so as to avoid breakage of needles or thread, the loose ends 55 supplying the additional thread drawn through the needles by the closing of the block 34.

As indicated, the strands 62 may be continuous from spools at the reel 61, if desired, but owing to the need of passing the cut blanks over the threads 54, it is not practicable to feed the warp 54 from spools under the present arrangement. If a hall runner or other rug of great length is to be manufactured of considerable length, however, after a maximum unit length has been woven, new warps 54 may be threaded in the needles either beside the already engaged warps 54 or after these have been drawn from the needles, and cemented or otherwise secured or tied to the original warps or into the rug, and the operation of the machine continued until a new replacement of warp 54 is required, which may be repeated as necessary. In this way rug stock of continuous extent may be woven.

On account of the location of the detent 43, it may be desirable to provide means to operate the latter automatically instead of manually, and for this purpose I have pivoted on the upper block 46 of the unloader a distance from the hinge a link 132, having a longitudinal slot 133 in its outer end receiving a pin 134 set in the side of the detent 43 so as to engage and hold the pin and detent in supporting position while the unloader is closed and in position A of Figure 3; but when the upper block 46 is swung to full open position as at B, the link is drawn so that the outer end of the slot engages the pin and draws the detent to disengaged position, allowing the main needle holder to move to its lower position B in Figure 3.

A stop to limit movement of the main needle holder past erect, or loading position may be provided as required, one form consisting of a pin 135 in the front side of the rear bearing bracket 31, and a pin 136 set in the hub 137 of the rear bracket arm 42' of the main needle holder.

I claim:

1. In a machine of the character described, a multiplicity of needles, means to hold them in an operative position for loading, means to feed fabric, and to press it onto the needles and cut the same, consisting of a cross arm extending over the operative position of said needles, a support member therefor extending from the rear side of the lower frame part and in supporting relation to the rear end of the cross arm, a carriage reciprocable on the cross arm, an arm pivoted on the frame rearwardly thereof and extending upwardly, a link between the arm and the carriage, an operating lever pivoted on the frame at the front of the machine; a link between the last named lever and said arm below the needles, a reel for fabric strip mounted on said frame adjacent the rear of said cross arm, a travelling gripper on the carriage comprising separable members, said strip engaged therebetween for gripping at times and slidable through the gripper at other times, means to close the gripper when at initial rearward position next the reel, a second gripper mounted on the front part of the cross arm, means to close the second gripper means on the carriage to open the second gripper when the carriage is at the outer or forward limit of movement, means on the cross arm to open the first gripper when at said forward limit of movement, and cutter means movable across and from the path of the carriage to cut the said strip when extended to the second gripper.

2. In a structure of the character described, a strip feed device comprising a stationary gripper device consisting of a lower stationary member and a spring pressed member pivoted thereover normally tending to bear upon the first, and a cam element thereon having an under side inclined upwardly in the direction from which the strip is to be fed, a strip supply spaced from the said gripper a distance, a traveller reciprocable between said supply and the first gripper, and including a gripper comprising a stationary lower member and an upper movable clamp member having a dead-center resilient actuating means constructed and arranged to actuate the member to move it from dead center to a limit position when moved past the dead center position in either direction, means to reciprocate the traveller, a member on the traveller to engage said cam face of the stationary gripper and pass therebeyond when the second gripper is in close opposed relation to the first, means to move the clamp member to open position including a member at the first gripper operative after said second gripper is in said close opposed relation, and being responsive to relative movement of the grippers, means adjacent the strip supply to engage the said clamp member and move it past dead center position toward closing position under movement of the traveller to initial position, said strip supply having an extremity engaged by the gripper of the traveller and means to sever the strip at a line spaced from the gripper on said traveller when the traveller is at initial position.

3. In a device of the character described a stationary gripper, a strip supply, a traveller reciprocable therebetween, said traveller including a gripper having a lower anvil portion, and a clamping jaw pivoted on an axis spaced horizontally from the line of grip of the jaw and anvil, for movement to and away from the anvil, the jaw having a cam part over its pivot with opposite slopes extending from a high part thereon, a leaf spring fixed on the traveller having a wiper engaged with the cam and tending to move the jaw in respective directions when engaged with the slopes, a stationary strike device positioned adjacent one limit of the traveller, positioned and constructed to engage and move the jaw in one direction by relative movement of the traveller, and a device adjacent the opposite limit of the traveller constructed and arranged to move the jaw in an opposite direction by relative movement of the traveller thereadjacent.

4. The structure of claim 3 in which the last named means consists of a bell crank lever pivoted on the traveller beside the jaw, one arm of the lever engaged with the jaw and adapted to lift the jaw, the other arm of the lever extending upwardly, and a horizontally movable lever normally substantially transverse to the direction of the path of the traveller and against the rear side of the last named arm, and a yielding member on the traveller adapted to be engaged by the transverse lever and to hook thereon by departing movement of the traveller.

5. In a strip feed device, a receiving stationary gripper comprising a fixed lower jaw member, an upper jaw member pivoted a distance from the gripping portions of the jaws, spring means tending to force the jaws into gripping engagement, the upper jaw having an inclined cam face advanced in the direction of approach of the strip, and having a terminal and oppositely presented shoulder, a travelling gripper including an anvil part and a clamp jaw pivoted rearwardly thereof and adapted to clamp on the anvil, a dead center cam and spring device, constructed to hold the clamp jaw alternately in open and closed positions under respective movements thereof, a strip supply at the distal part of the path of the traveller, a striker thereadjacent constructed to engage and move the clamp jaw to closed position, a bell crank on the traveller having an arm engaged with the clamp jaw to open the same and having an arm transverse to the path of the traveller and means operatively associated therewith to engage said first named cam face under movement of the traveller toward and past the cam, and to engage the shoulder thereof by opposite movement of the traveller from the cam whereby the shoulder will move the crank to open the clamp jaw of the traveller under rearward movement of the traveller.

6. In a device of the character described, a needle loader and unloader comprising a needle holder consisting of two members hinged at one longitudinal edge and constructed to receive and clamp between its opposite edges needles for the purposes described, a pivot mounting therefor whereby it may swing from normal operative position with needles presented for loading to inoperative position with the needles presented a distance therefrom, means to secure the holder in holding relation to needles, releasable for opening of the holder, an unloader consisting of a holder similar to the first and movable to a position to receive therein when open the points of needles held in the first holder when moved to said inoperative position, and being movable to an unloading position, with engaged needles.

7. The structure of claim 6 including a strip supply, strip feed means constructed to position a strip upon the points of the needles, and means to cut the strip.

8. The structure of claim 6 in which said needles have eyes, threads in the needles, a strip supply, means to position strip upon the points of the needles, and means to cut the strip.

9. The structure of claim 6 in which a cross arm is mounted over the first named needle holder, a strip reel at one end thereof, a stationary gripper at the opposite end of the arm, a travelling gripper reciprocable on the arm, means cooperative between the grippers to open and close the first on final approaching movement of the second, to open the travelling gripper when returning from adjacent the stationary gripper to initial position, and to close the travelling gripper at all other times, stationary knife blades projected across the plane of the needles and thereabove below the grippers, coacting blades movable to sever interposed strip, means to reciprocate the travelling gripper, and means to operate the said coacting blades alternately with the reciprocation of the traveller.

10. In a rug machine of the character described, a needle holder, a multiplicity of removable needles arranged linearly therein in pairs and in parallel relation with projected pointed ends presented in one direction, means to feed fabric strip stock across the axes of the needles in close relation to their points and in alinement with the series, and cutters constructed and arranged in operative relation to the strip so alined and operative in the spaces between the pairs of needles, whereby to sever the strip between the pairs of needles and form segments having at least two needles engaged therethrough, said machine including means to press the segments upon the needles.

ACHSA WRIGHT.